US007236681B2

(12) United States Patent
Moheb et al.

(10) Patent No.: US 7,236,681 B2
(45) Date of Patent: *Jun. 26, 2007

(54) FEED ASSEMBLY FOR MULTI-BEAM ANTENNA WITH NON-CIRCULAR REFLECTOR, AND SUCH AN ASSEMBLY THAT IS FIELD-SWITCHABLE BETWEEN LINEAR AND CIRCULAR POLARIZATION MODES

(75) Inventors: Hamid Moheb, Clemmons, NC (US); Michael L. Penley, Claremont, NC (US)

(73) Assignee: Prodelin Corporation, Newton, NC (US)

(*) Notice: Subject to any disclaimer, the term of this patent is extended or adjusted under 35 U.S.C. 154(b) by 125 days.

This patent is subject to a terminal disclaimer.

(21) Appl. No.: 10/949,823

(22) Filed: Sep. 25, 2004

(65) Prior Publication Data

US 2005/0116871 A1 Jun. 2, 2005

Related U.S. Application Data

(60) Provisional application No. 60/505,784, filed on Sep. 25, 2003.

(51) Int. Cl.
*G02B 6/00* (2006.01)

(52) U.S. Cl. ....................................... 385/147; 385/146

(58) Field of Classification Search ..................... None
See application file for complete search history.

(56) References Cited

U.S. PATENT DOCUMENTS

| | | | |
|---|---|---|---|
| 3,001,159 A | 9/1961 | Hilsinger | |
| 3,622,921 A | 11/1971 | Heeren | |
| 3,827,051 A * | 7/1974 | Foldes | 370/203 |
| 3,978,434 A | 8/1976 | Morz et al. | |
| 4,008,477 A | 2/1977 | Babij et al. | |
| 4,060,781 A | 11/1977 | Hudspeth et al. | |
| 4,222,017 A | 9/1980 | Foldes | |
| 4,224,622 A | 9/1980 | Schmidt | |
| 4,251,787 A | 2/1981 | Young et al. | |

(Continued)

FOREIGN PATENT DOCUMENTS

EP 0 644 608 A2 3/1995

(Continued)

OTHER PUBLICATIONS

H. Moheb, C. Robinson, J. Kijesky, Design & Development of Co-Polarized Kuband Ground Terminal System for Very Small Aperture Terminal (VSAT) Application, IEEE Antennas and Propagation Society International Symposium, 1999 Digest, Jul. 11-16, 1999, vol. 3, p. 2158-2161.

(Continued)

*Primary Examiner*—Sung Pak
(74) *Attorney, Agent, or Firm*—Hunton & Williams LLP

(57) ABSTRACT

A feed assembly for an antenna having a non-circular reflector, in which the feed assembly includes a feed horn capable of correcting the distortions of circularly polarized signals caused by the non-circular reflector profile, and wherein the feed horn is coupled with a polarizer that is field-switchable between linear and circular polarization modes of operation. The feed assembly can include a second receive-only feed located in close proximity to the feed horn for communication with adjacent satellites.

24 Claims, 7 Drawing Sheets

U.S. PATENT DOCUMENTS

| | | | | |
|---|---|---|---|---|
| 4,311,973 | A | 1/1982 | Nuding et al. | |
| 4,344,048 | A | 8/1982 | Morz | |
| 4,356,495 | A * | 10/1982 | Morz | 343/786 |
| 4,467,294 | A | 8/1984 | Janky et al. | |
| 4,472,721 | A | 9/1984 | Morz et al. | |
| 4,491,810 | A | 1/1985 | Saad | |
| 4,516,089 | A | 5/1985 | Goscianski et al. | |
| 4,528,528 | A | 7/1985 | Augustin | |
| 4,607,260 | A | 8/1986 | Dragone | |
| 4,608,573 | A | 8/1986 | Paullin | |
| 4,622,524 | A | 11/1986 | Morz | |
| 4,630,059 | A | 12/1986 | Morz | |
| 4,673,905 | A | 6/1987 | Yamawaki et al. | |
| 4,777,459 | A | 10/1988 | Hudspeth | |
| 4,821,046 | A | 4/1989 | Wilkes | |
| 4,901,369 | A | 2/1990 | Momose et al. | |
| 5,136,294 | A | 8/1992 | Iwata | |
| 5,162,808 | A | 11/1992 | Kim | |
| 5,216,432 | A | 6/1993 | West | |
| 5,229,736 | A | 7/1993 | Adams et al. | |
| 5,276,410 | A | 1/1994 | Fukuzawa et al. | |
| 5,276,456 | A | 1/1994 | Kim | |
| 5,309,167 | A | 5/1994 | Cluniat et al. | |
| 5,420,599 | A | 5/1995 | Erkocevic | |
| 5,434,586 | A | 7/1995 | Kinoshita et al. | |
| 5,459,441 | A | 10/1995 | Weber et al. | |
| 5,463,406 | A | 10/1995 | Vannatta et al. | |
| 5,463,407 | A | 10/1995 | West et al. | |
| 5,495,258 | A | 2/1996 | Muhlhauser et al. | |
| 5,534,881 | A | 7/1996 | Young et al. | |
| 5,550,554 | A | 8/1996 | Erkocevic | |
| 5,552,797 | A | 9/1996 | Cook | |
| 5,557,291 | A | 9/1996 | Chu et al. | |
| 5,578,972 | A | 11/1996 | Hadden et al. | |
| 5,606,334 | A | 2/1997 | Amarillas et al. | |
| 5,614,916 | A | 3/1997 | Mizuguchi | |
| 5,635,944 | A | 6/1997 | Weinstein et al. | |
| 5,684,494 | A | 11/1997 | Nathrath et al. | |
| 5,684,495 | A * | 11/1997 | Dyott et al. | 343/785 |
| 5,686,923 | A | 11/1997 | Schaller | |
| 5,686,926 | A | 11/1997 | Kijima et al. | |
| 5,737,698 | A | 4/1998 | Gabrelian et al. | |
| 5,781,087 | A | 7/1998 | Milroy et al. | |
| 5,805,116 | A | 9/1998 | Morley | |
| 5,812,096 | A | 9/1998 | Tilford | |
| 5,831,582 | A | 11/1998 | Muhlhauser et al. | |
| 5,870,060 | A | 2/1999 | Chen et al. | |
| 5,870,062 | A | 2/1999 | Cox | |
| 5,990,842 | A * | 11/1999 | Lo Forti et al. | 343/756 |
| 6,005,528 | A | 12/1999 | Preiss | |
| 6,018,276 | A | 1/2000 | Hirota et al. | |
| 6,031,505 | A | 2/2000 | Qi et al. | |
| D431,555 | S | 10/2000 | Cronin et al. | |
| 6,166,610 | A * | 12/2000 | Ramanujam et al. | 333/21 A |
| 6,211,842 | B1 | 4/2001 | Cousin et al. | |
| 6,297,710 | B1 * | 10/2001 | Cook et al. | 333/21 A |
| 6,417,815 | B2 | 7/2002 | Moheb | |
| 6,480,165 | B2 * | 11/2002 | Moheb et al. | 343/781 R |
| 6,504,514 | B1 * | 1/2003 | Toland et al. | 343/781 P |
| 6,529,098 | B2 * | 3/2003 | Moheb | 333/135 |
| 6,677,911 | B2 * | 1/2004 | Moheb | 343/786 |
| 6,720,933 | B2 * | 4/2004 | Hanlin et al. | 343/786 |
| 7,002,528 | B2 * | 2/2006 | Moheb | 343/781 R |
| 2001/0028330 | A1 * | 10/2001 | Moheb et al. | 343/781 R |
| 2001/0030629 | A1 | 10/2001 | Moheb | |
| 2005/0116871 | A1 | 6/2005 | Moheb et al. | |

FOREIGN PATENT DOCUMENTS

| | | |
|---|---|---|
| EP | 0 805 511 A2 | 11/1997 |
| FR | 2 609 842 | 7/1988 |
| FR | 2 793 073 | 11/2000 |

OTHER PUBLICATIONS

Hamid, M.A.K., et al., A Dielectric-Loaded Circular Waveguide Antenna, IEEE Trans. Antennas Propagat, vol. AP-20, p. 96-97, Jan. 1972.

Salema, et al., Solid Dielectric Horn Antennas, p. 4-6, 1998.

Johnson, et al., Antenna Engineering Handbook, $2^2$ Ed., p. 21-23, 1984.

James, J.R., Engineering Approach to the Design of Tapered Dielectric-Rod and Horn Antennas, Radio Electron Eng., vol. 42, p. 251-259 and p. 371-379, Jun. 1972.

Gilat-To-Home 75E Instruction and Assembly Instructions, pp. 1-23, (Aug. 2000).

Channel Master Advertisement in Via Satellite Journal Publication, 2 pages (Jan. 2001).

Channel Master Model 6110 TOS Assembly Instructions (Mar. 1994).

Channel Master Model 6110TN Mounting Instructions, 2 pages, (Jan. 1995).

* cited by examiner

FEED ASSEMBLY FOR MULTI-BEAM ANTENNA WITH NON-CIRCULAR REFLECTOR, AND SUCH AN ASSEMBLY THAT IS FIELD-SWITCHABLE BETWEEN LINEAR AND CIRCULAR POLARIZATION MODES

CROSS-REFERENCE TO RELATED APPLICATIONS

The present application claims priority from U.S. Provisional Application Ser. No. 60/505,784 entitled FEED ASSEMBLY FOR MULTI-BEAM ANTENNA WITH NON-CIRCULAR REFLECTOR, AND SUCH AN ASSEMBLY THAT IS FIELD-SWITCHABLE BETWEEN LINEAR AND CIRCULAR POLARIZATION MODES, filed Sep. 25, 2003, the contents of which are incorporated herein by reference.

FIELD OF THE INVENTION

The invention relates to antennas for establishing communication links with satellites in geostationary orbit about the earth. The invention relates in particular to an antenna having a non-circular reflector and a feed assembly that is field-switchable between circularly polarized and linearly polarized operating modes, and to a multi-beam antenna having a non-circular reflector and a feed assembly that is capable of establishing communications with two or more satellite, where at least two of the satellites are closely spaced.

BACKGROUND OF THE INVENTION

An increasing number of information services are now offered via satellite communication. Specifically, there are a wide variety of satellites positioned in geostationary orbit about the earth for providing various services to users on the ground. Such services include, for example, one-way (also referred to as receive-only) services such as television services, and two-way (also referred to as transmit and receive) services such as Internet communications. Unfortunately, many related services are offered on different satellites. For example, general satellite TV programming may be provided on one satellite, while Internet services are offered by another satellite, while still other satellites may offer high definition TV programming or foreign language TV programming. A user that subscribes to two or more of these services must have the ability to communicate with each of the satellites that provide the selected services. While this can be accomplished using different antennas corresponding to each satellite, this solution is neither practical nor acceptable for most customers. For this reason, there has been a significant uptake in the past few years in technology that allows for use of one antenna solution to communicate with multiple satellites. These antenna solutions are sometimes referred as multi-beam antennas.

There are various issues associated with the design of multi-beam antennas. One such issue is reflector profile. Specifically, multi-beam antennas include various feeds for communication with different satellites. For example, if an antenna is designed to communicate with three separate satellites, the antenna will include three separate feeds, one associated with each of the satellites. These feeds are all spaced in front of the reflector of the antenna. For proper communication, the feeds must be oriented properly with respect with the reflector in order to optimize reception and/or transmission of signals between the feed and its associated satellite, while avoiding crosstalk with other satellites. In a multi-beam solution, a reflector having an elliptical profile is generally preferred over a reflector having a circular profile. Specifically, a circular reflector generally does not narrow the beam of the signals received from the satellites. As such, all of the beams overlap significantly near the focal point of the reflector. A reflector having an elliptical profile, on the other hand, can be configured such that signals from different satellites can be generally focused at different points in front of the reflector. Specifically, it is necessary to make the beams transmitted by the satellites narrower in the azimuth plane (i.e., along the geostationary arc) to avoid interference or crosstalk from the closely adjacent satellites. Consequently, it is necessary to employ an antenna having a profile that is narrower in the vertical direction than in the horizontal direction; such as for example, an elliptical reflector, rectangular, or similar non-circular profile, (i.e., one having an aspect ratio of greater than one).

While use of a reflector having an elliptical profile allows multiple feeds to be placed in the same antenna solution, there are some drawbacks to use of these reflectors. Specifically, some satellites communicate via circularly polarized signals, as opposed to linear polarized signals. A circularly polarized signal consists of two vector components that are rotationally oriented ninety (90) degrees relative to each other. Further, the vector components have the same magnitude. To maintain the integrity of the signal, the vectors must remain substantially at the same magnitude, and they must remain substantially orthogonal to each other. To maintain the integrity of a circularly polarized signal, the vectors must remain substantially at the same magnitude, and they must remain substantially orthogonal to each other. Circular antenna reflectors maintain this electrical symmetry. Elliptical reflectors, on the other hand, do not maintain this symmetry because of their different dimensions in the horizontal and vertical directions. Thus, elliptical reflectors are typically not used with circular polarized communications, thereby making it difficult to provide a multi-beam solution where at least one of the satellites communicates using circularly polarized signals.

An additional issue with multi-beam solutions is satellite position spacing. As more satellites are introduced into orbit, the angular spacing between the satellites will decrease. In fact, currently there are several satellites that are positioned within a range of 5 degrees or less of arc with respect to each other. The proximity of these satellites to each other is somewhat problematic from the standpoint of using one antenna to establish individual communication links with both of these satellites.

Specifically, to communicate with multiple satellites, an antenna will typically include individual feeds dedicated to communicating with one of the satellites. Because of the closeness in angular proximity of some satellites, these wave-guides should be placed in close proximity to each other on the antenna to properly communicate with their respective satellites. The problem is that many conventional corrugated wave-guide designs cannot be used, because of the reduced spacing required between the phase centers of the wave-guides needed to receive from and transmit signals to the satellites is such that the conventional individual wave-guides would occupy overlapping space due to their size.

In view of these concerns, applicant has created various multi-beam antenna solutions for specific communication environments. For example, U.S. Pat. No. 6,480,165, entitled "Multi-beam Antenna For Establishing Individual Communication Links With Satellites Positioned In Close Angular Proximity To Each Other" discloses a multi-beam antenna solution for communicating with closely spaced satellites, where one feed is configured for two-way communication and the other feed is configured for one-way communication. In this antenna solution, one of the feeds is filled with a dielectric material. The use of the dielectric material allows the feed to made smaller in size, which in turn, allows the two feeds to be spaced in close proximity for communicating with the closely spaced satellites.

Recently, applicant also developed a feed solution that allows communication of circular polarized signals using a reflector having a non-circular profile, such as an elliptical profile. Specifically, U.S. patent application Ser. No. 10/370,166 filed Feb. 20, 2003 and entitled "Circularly Polarized Receive/Transmit Elliptic Feed Horn Assembly For Satellite Communications" discloses a feed solution formed of a plurality of corrugations. The corrugations progressively transition from substantially circular at an end closest to the receiver, to substantially non-circular at the opposite end of the corrugated section that faces the reflector. The non-circular corrugations are configured to correct the distortions of the circularly polarized signals induced by the non-circular reflector profile.

The above developments address many of the issues relating to multi-beam antenna solutions. Specifically, these systems provide solutions for communicating with closely spaced satellites and communication using circularly polarized signals in an antenna solution that uses a reflector having an elliptic profile. However, there are other issues yet to be addressed. Specifically, there is currently a need for an antenna solution that facilitates communication with at least two closely spaced satellites, where one of the feeds is capable of being configured to either communication circularly polarized or linearly polarized signals based on its configuration.

This antenna solution involves communication with at least one Fixed Satellite Services (FSS). FSS is a two-communication system (i.e., both transmit and receive) for internet, data, voice, etc. communications. FSS has somewhat more stringent standards than the more traditional direct Broadcast Satellite Services (BSS). Specifically, FSS has a more stringent rejection standard for closely spaced feeds. The communication beam must be narrower in the azimuth plane to avoid interference. FSS requires at least a 12 dB drop off. This minimum drop off ensures that there is not an excess level of crosstalk between adjacent feeds.

An added issue with multi-beam antenna solutions is the transition from use of satellites that communicate using linear polarization to satellites that communicate using circular polarized signals, or visa versa. Specifically, there are current antenna solutions that communicate with satellites that use linear polarization for communication. Plans are to replace some of these satellites with satellites that communicate using circularly polarized signals. As such, prior to replacement of the satellite, an antenna solution is needed that communicates using linearly polarized signals. However, after replacement, an antenna solution is needed that communicates using circularly polarized signals. One solution would to retrofit each antenna when the transition occurs. This, unfortunately, is not a viable solution.

On the one hand, satellite spacing requirements demand an elliptic aperture to eliminate cross talk and to provide higher level of signal isolation at two degree adjacency. On the other hand, both direct broadcast satellite (DBS) and future FSS satellites are typically designed to operate with circularly polarized signals, either Right Handed or Left Handed (RHCP/LHCP) ground antennas. Consequently, the reflector and feed horn assemblies should be versatile to accommodate the two degree satellite rejection and at the same time, operate in both linearly and/or circularly polarized environment. The combined solution of multi-satellite operation, cross talk, and circularly polarized requirements is an elliptical reflector profile that establishes satellite communications link and functions in both linearly and circularly polarized environments. However, the reflector ellipticity destroys the system symmetry as required for circularly polarization and creates a high level of axial ratio or cross-polarization.

In light of the above, a new antenna solution is needed that allows a multi-beam antenna to communicate with two closely spaced satellites, where both satellites use one-way communication, at least one of the satellites is an FSS satellite, and where one of the feeds is capable of being configured to communicate either linear polarized signals or circularly polarized signals.

SUMMARY OF THE INVENTION

The present invention provides various feed solutions to address issues associated with use of multi-beam antennas. Specifically, the present invention provides feed solutions that allow two feeds to be spaced in close proximity to each other for use in satellite communications with closely spaced antennas. Further, the present invention provides feed solutions that facilitate communication of circularly polarized signals using a reflector with an elliptical profile. In addition, feed solutions are provided that address the more stringent drop off parameter of FSS satellites and provide feeds that can be transitioned in the field from linear polarized communications to circularly polarized communications.

The feed solutions of the present invention, among other things, address the problem associated with the planned switch of the Ku-band (10.7–14.5 GHz) FSS satellite from linear to circular polarization. For example, the various solutions provided herein can be used to construct a multi-beam antenna solution that includes a reflector with an elliptical profile, at least two closely spaced feeds, where at least one feed is capable of communicating with an FSS satellite. Further, at least one of the feeds is capable of communicating using circularly polarized signals in conjunction with the elliptical reflector and can be transitioned in the field from a linear polarized configuration to a circularly polarized configuration.

For example, in one embodiment, the present invention provides a feed assembly for an antenna having a non-circular reflector, in which the feed assembly includes a feed horn capable of correcting the distortions of circularly polarized signals caused by the non-circular reflector profile, and wherein the feed horn is coupled with a polarizer that is field-switchable between linear and circular polarization modes of operation.

More particularly, the feed horn preferably comprises a circular waveguide section, a corrugated waveguide section having a wall encircling a longitudinal axis of the feed horn, and a conical waveguide section connected between the corrugated waveguide section and the circular waveguide section for transitioning between the circular and corrugated sections. The corrugated section has a series of spaced corrugations that progressively transition from substantially circular at the end of the corrugated section adjacent the conical section, to substantially non-circular at the opposite end of the corrugated section that faces the reflector. The non-circular corrugations are configured to correct the distortions of the circularly polarized signals generated by the non-circular reflector profile.

The polarizer is rotatably coupled to the end of the circular waveguide section opposite from the end coupled to the conical section. The polarizer is rotatable with respect to the feed horn between first and second angularly spaced orientations (e.g., displaced 45° apart), the polarizer being structured and arranged in the first orientation to be substantially transparent to a linearly polarized signal propagated through the assembly, and in the second orientation to impart right or left handedness to a circularly polarized signal propagated through the assembly. Accordingly, by simply rotating the polarizer, the feed assembly can be switched between linear and circular polarization modes.

In one embodiment, the polarizer comprises a circular cylindrical hollow tube having a dielectric card or vane mounted inside the tube so as to divide the interior space into two semi-cylindrical halves. When the vane is oriented vertically or horizontally, the polarizer is substantially transparent to linearly polarized signals propagated through it. When the polarizer is rotated 45 degrees relative to vertical in one direction, the polarizer is properly configured for propagating right-hand circularly polarized (RHCP) signals; when rotated 45 degrees in the opposite direction, the polarizer is configured for propagating left-hand circularly polarized (LHCP) signals.

The feed assembly can also include a separate second feed positioned closely adjacent the feed horn for establishing a communications link with a second satellite (e.g., a BSS satellite or another FSS satellite) spaced as close as 2 degrees from the first satellite (e.g., an FSS satellite). One or both of the first feed horn and the second feed horn can contain a dielectric having a dielectric constant greater than 1.0 so as to allow the dimensions of the feed(s) to be reduced to facilitate the required close proximity of the two feeds. Either or both of the feeds may be filled with a dielectric material to reduce their overall size as is described in U.S. Pat. No. 6,480,165 to thereby facilitate close spacing of the feeds.

The feed assembly includes a coupling arrangement that rotatably couples the polarizer and the circular waveguide section of the feed horn. In one embodiment of the invention, the circular waveguide section of the feed horn has a radially outwardly projecting flange formed proximate the end of the circular waveguide section that connects to the polarizer. The polarizer comprises a substantially circular cylindrical main body having a first end adjacent the flange and an opposite second end, the main body having a radially outwardly projecting first ring formed proximate the first end of the main body. The coupling arrangement includes a first coupler structured and arranged to engage the first ring on the polarizer and the flange on the circular waveguide section so as to substantially prevent relative axial movement therebetween while permitting the polarizer to rotate relative to the circular waveguide section.

In a particular embodiment, the first coupler comprises a band-shaped member that surrounds the flange and first ring and defines a circumferential groove in which the flange and first ring are retained. Advantageously, the first coupler is formed in two generally semicircular halves that are releasably joined together by fasteners. It is also advantageous for the polarizer to include a stop that interacts with a fixed structure of the feed assembly so as to limit rotation of the polarizer.

In one embodiment, the solution may include added feeds for communication with other satellites. For example, in one embodiment, the solution includes a feed spaced apart from the first two feeds for communication with a satellite space apart from the first two satellites by fourteen degrees. The solution can accommodate a wide range of satellite spacings in the range of one to twenty-two degrees.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
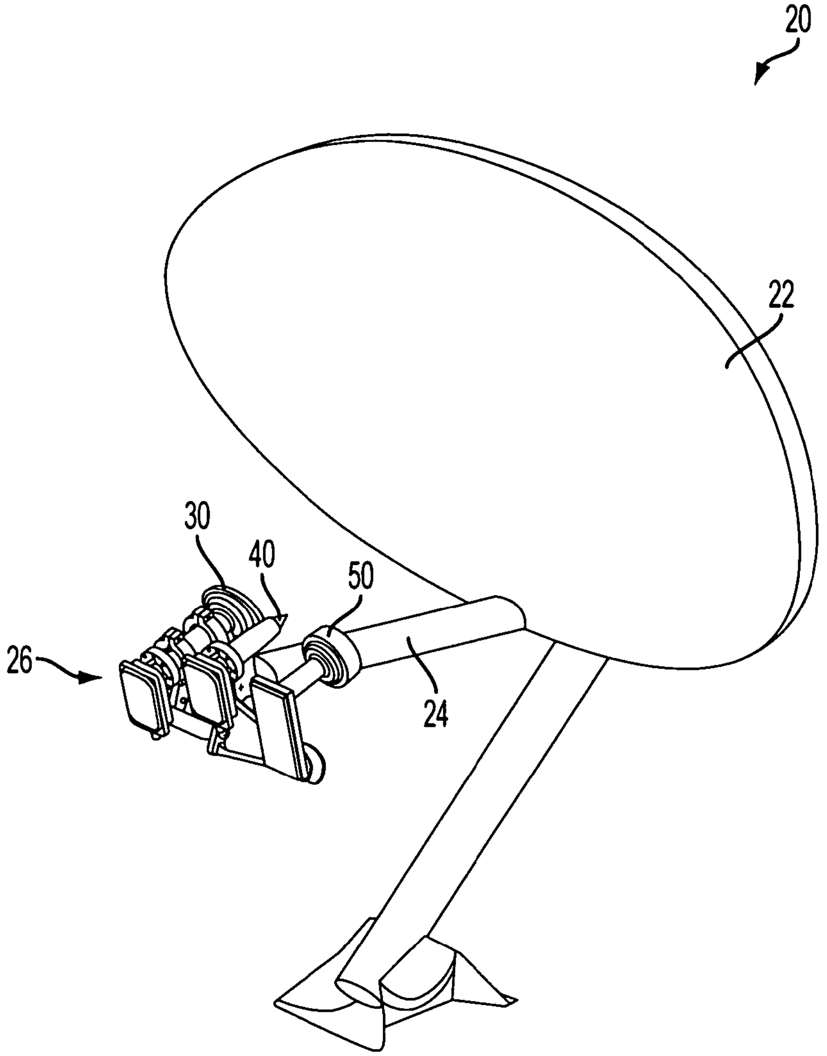
FIG. 1 is a perspective view of an antenna in accordance with one embodiment of the invention.

A multi-beam antenna 20 in accordance with one embodiment of the invention is shown in FIG. 1. The antenna includes a reflector 22 of non-circular profile; in the illustrated embodiment, the reflector has an elliptical profile, but the invention is not limited to such profile. It also applies to any geometry having aspect ratio larger than 1. Mounted on a boom 24 in front of the reflector is a feed assembly 26 having three feeds for establishing three separate communication links with three different satellites. A first feed horn 30 is used for establishing a communications link with a first satellite (e.g., an FSS satellite) in geostationary orbit. A second feed 40 establishes a link with a second satellite (e.g., a BSS satellite) located in geostationary orbit with a small angular separation from the first satellite; the separation may be as close as two degrees. A third feed 50 establishes a communication link with a third satellite located in geostationary orbit with a larger angular separation from the second satellite; the separation may be as much as 22 degrees. In the illustrated embodiment, all three feeds 30, 40, 50 comprise receive-only feeds for establishing one-way communications links with the three satellites. However, the invention is not limited to receive-only feed assemblies; in particular, the feed horn 30 can be used in a transmit and receive feed assembly as disclosed in co-pending U.S. patent application Ser. No. 10/370,166. One or both of the other two feeds also could be configured for transmit and receive operation, if desired.

Figure 2:
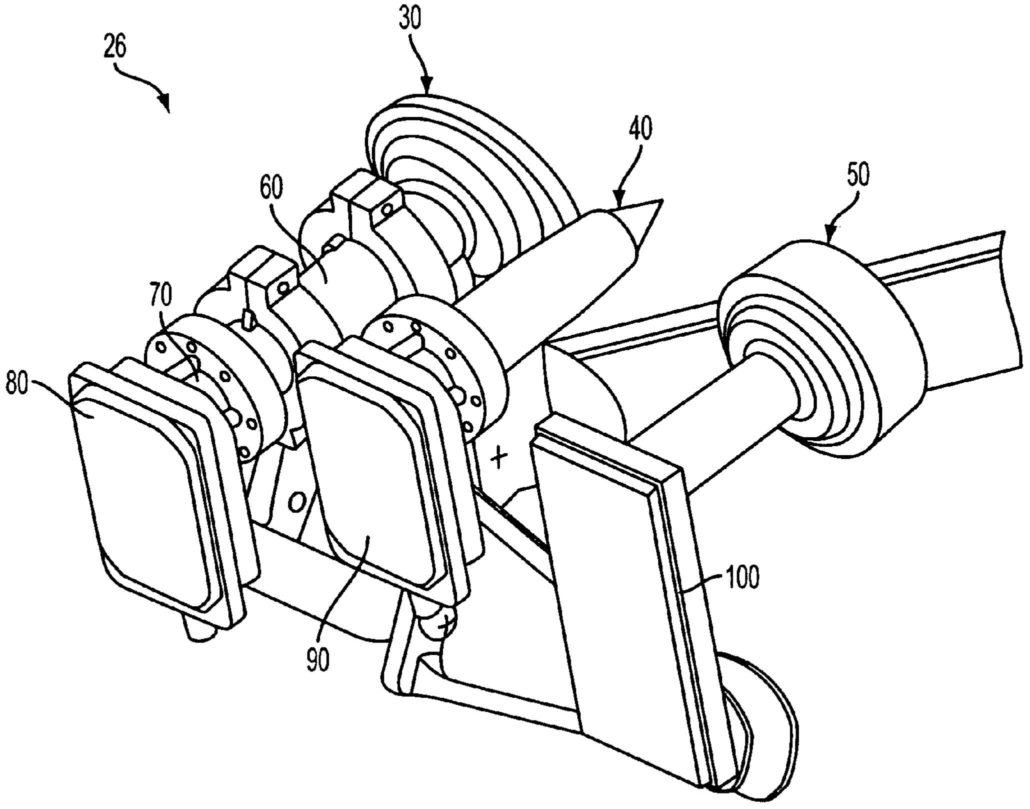
FIG. 2 is a perspective view, enlarged, of the feed assembly of the antenna.
Figure 3:
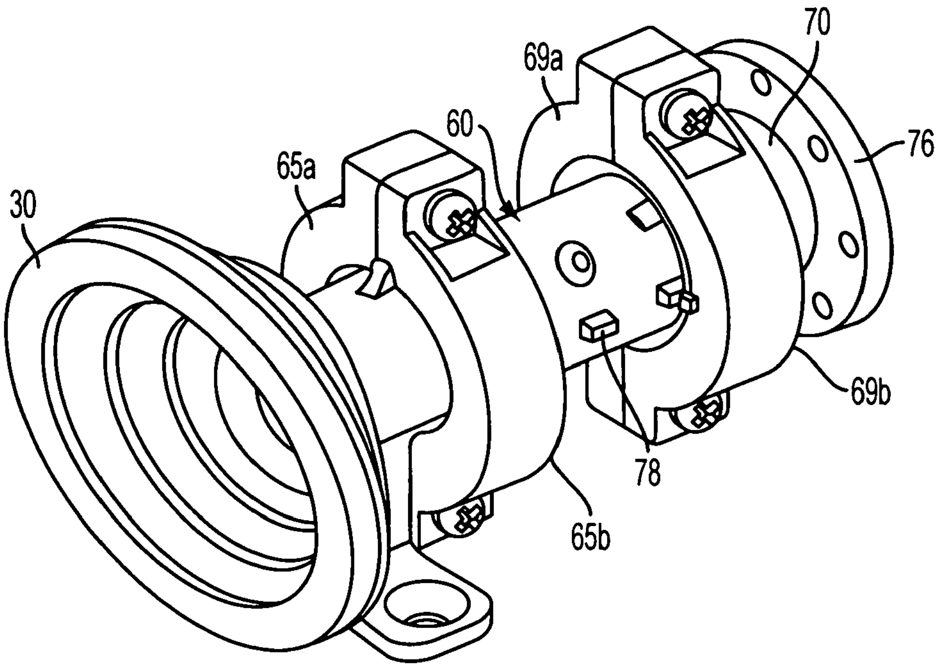
FIG. 3 is a perspective view of the FSS feed horn and polarizer assembly used in the feed assembly.

With reference to FIG. 2, showing the feed assembly 26 in greater detail, the elliptical circularly polarized feed horn 30 is coupled to a polarizer 60, which in turn is coupled via a waveguide transition 70 to a low noise block (LNB) 80 that converts the received signals from their as-received frequency (e.g., Ku band, 10.95–12.75 GHz, or Ka band, 19.7–20.2 GHz) to the RF frequency range (e.g., 950 to 2500 MHz). In use, the LNB 80 is connected via a coaxial cable (not shown) to an indoor set-top box, as known in the art. Likewise, the second feed 40 is coupled to an LNB 90. Similarly, the third feed 50 is coupled to an LNB 100. As further described below, the polarizer 60 can be rotated with respect to the feed horn 30 for switching from a linear polarization mode to a circular polarization mode of operation.

FIGS. 3 through 6 show the assembly of the feed horn 30 and polarizer 60 in further detail. The feed horn 30 is substantially as described in co-pending U.S. patent application Ser. No. 10/370,166 filed Feb. 20, 2003, which is incorporated herein by reference. The single-piece feed horn has phase compensation embedded therein. The feed horn has a non-circular shape (e.g., elliptical), and comprises a series of corrugations. Each corrugation has a specific shape and thickness. The corrugations transition from less circular in shape to more circular in shape in a direction from the front of the feed horn that faces the reflector of the antenna to the back of the feed horn that connects to the polarizer 60. The corrugations are designed such that they compensate for the changes in a circularly polarized signal caused by the non-circular reflector and feed horn. Importantly, this phase-compensated feed horn reduces the size and complexity of the feed system assembly over that of prior compensation systems.

The present invention provides a non-circular feed horn capable of propagating RHCP and/or LHCP signals, as well as linearly polarized (LP) signals. In a preferred embodiment, the feed horn is designed for the Ku-band in the 10.95 to 14.5 GHz range. More particularly, the received signals from the satellite covers the 10.95 to 12.75 GHz band. The feed horn transmits signals to the satellite. The transmitted signal is from the 13.75 to 14.5 GHz band. The feed horn is a corrugated, non-circular conical horn with embedded phase compensators that works with elliptical and/or non-circular reflector profiles. It is understood that the feed horn could instead be designed for the Ka-band, as well.

In the embodiments discussed herein, the reflector is illustrated as elliptical in shape and the feed horn has an elliptic shape for proper reflector illumination. It must be understood that present invention is not restricted to elliptical configurations, and may be used with any non-circular shaped reflector, i.e., rectangular, oval, and corresponding feed horn. Specifically, a corrugated feed horn having any aspect ratio can be designed such that the depths that the corrugations extend into the inner wall of the feed horn properly compensate a circularly polarized signal propagating therethrough for distortions caused by a non-circular reflector. The depths for each corrugation can be determined using the equations set forth in co-pending application Ser. No. 10/370,166, such that a plurality of corrugations can collectively compensate the signal.

Figure 4:
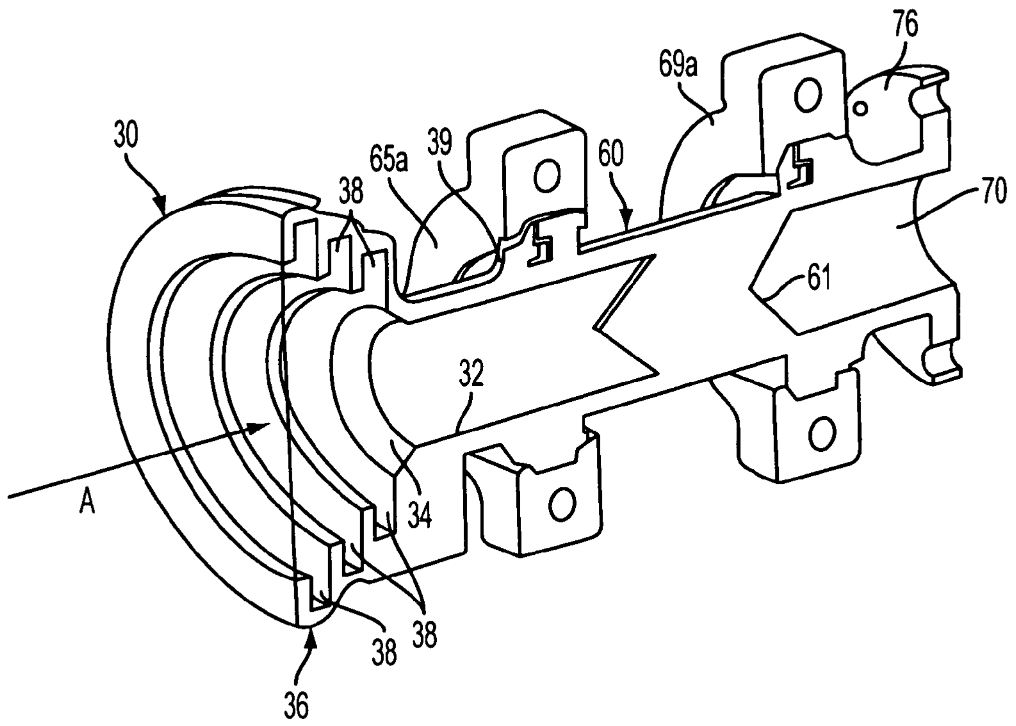
FIG. 4 is a sectioned perspective view of the FSS feed horn and polarizer assembly.
Figure 5:
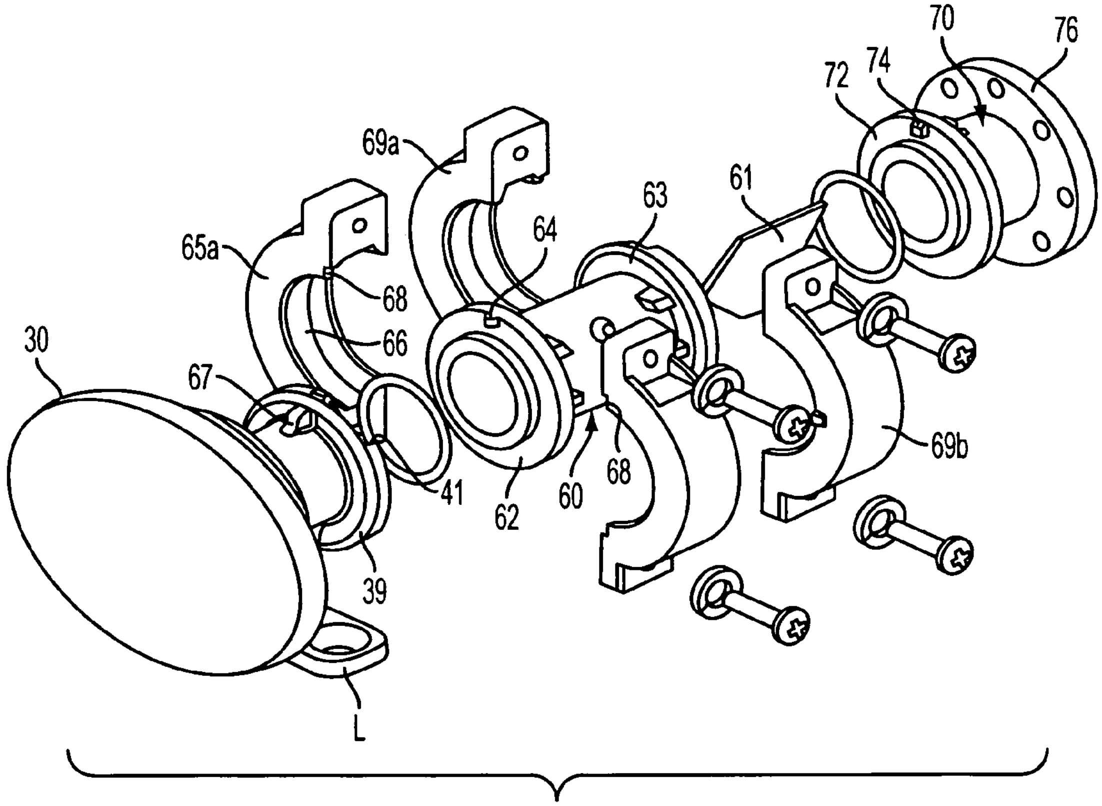
FIG. 5 is an exploded view of the FSS feed horn and polarizer assembly.
Figure 6:
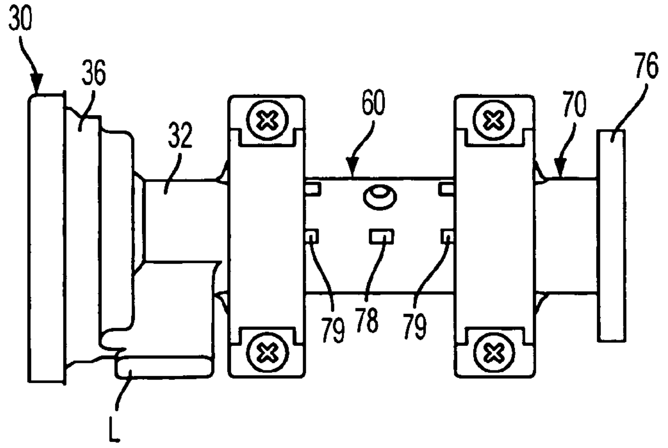
FIG. 6 is a side elevation of the FSS feed horn and polarizer assembly.

The feed horn 30 is designed to properly illuminate the elliptic reflector aperture while operating in both LP as well as RHCP/LHCP polarizations. As illustrated in FIGS. 4 and 5, in one advantageous embodiment, the feed horn includes three sections, namely a circular hollow waveguide section 32, a conical section 34, and a corrugated feed horn section 36. The conical section and corrugated section extend from the circular hollow waveguide section in a direction toward the reflector of the antenna.

The circular waveguide section 32 is a hollow waveguide having a circular cross-section to support the Ku receive band (10.95 to 12.75 GHz). It is also possible to configure the waveguide to support both the Ku receive band as well as the transmit band (13.75 to 14.5 GHz). The hollow waveguide's cross-section is chosen so as to insure the propagation of the two orthogonal dominant modes of the circularly polarized signal, and prevent the excitations of higher order modes. The circular waveguide section's length is optimized in conjunction with the conical section 34 and corrugated section 36 to ensure proper phase and amplitude at the back end of the feed horn.

With regard to the conical section 34, this section is a transitional region between the circular waveguide section 32 and the corrugated section 36. The throat region of the conical section is a smooth conical section to provide low return loss at both transmit and receive bands and a low level of higher-order modes. The conical section is about 0.3λ in length at the receive band for good electrical match and subsequently superior axial ratio performance. The conical section has a wide semiflare angle θ greater than 20°, to illuminate the reflector with a proper copolar radiation pattern. The throat region is instrumental to control the input impedance and the mode conversion from the circular waveguide section 32 to the elliptic corrugated section 36 opening for low voltage standing wave ratio (VSWR). The low VSWR is necessary to obtain low axial ratio and in turn, an excellent cross-polarization for both RHCP and LHCP operation.

Connected to the conical section 34 is a corrugated section 36 comprising a series of elliptical corrugations or grooves 38 in the shape of rings. The corrugations or propagation rings 38 are designed to compensate for unequal phase and amplitude distribution of a non-circular profile. Each propagating ring is optimized so as to provide proper phase and amplitude between the fudamental modes of a circularly polarized signal propagating therethrough, keeping the appropriate edge illumination. The corrugations or propagating rings are designed for operation over a desired range of frequencies for total symmetry of E- and H-fields with proper phase differential. The propagating ring size is gradually increased toward the feed horn aperture to control the reflector edge illumination.

More specifically, with reference to FIG. 4, the corrugated section 36 of the feed horn transitions from an elliptical shape at the first propagating ring 38 nearest the reflector (on the left in FIG. 4) that matches the ellipticity of the reflector profile of the antenna, to a circular shape at the last propagating ring 38 nearest the conical waveguide section 34. Specifically, in the direction A signifying a path from the reflector of an antenna to a receiver of an antenna, the propagation rings transition from more-elliptical shapes to more-circular shapes. Each propagation ring includes a major and a minor axis. The ratios between the major and minor axes for the first propagation ring is greater than that of the next propagation ring, and so on, to the point where the last propagation ring meets the circular throat of the conical section 34.

In effect, the propagation rings transition a signal propagating in the direction A from an elliptical to a circular signal. Similarly, in the case of a transmit and receive application, for transmitted signals propagating opposite to the direction A, the propagation rings transition the signal electrically from a circular signal to an elliptical signal to match the ellipticity of the reflector of the antenna.

The feed horn has an axis of symmetry extending longitudinally through the circular waveguide section 32, conical waveguide section 34, and corrugated section 36. In the corrugated section, a series of corrugations 38 are spaced along the longitudinal axis of symmetry. The corrugations are a series of grooves in the inner wall of the corrugated section 36. The width of each groove in the longitudinal direction of the feed horn and the depth of each groove into the side wall in the radial direction are tailored as required to achieve the proper phase and amplitude compensation. Specifically, the depth of each corrugation compensates for the distortions caused by use of an elliptical reflector to reflect a circularly polarized signal. A circularly polarized signal propagating along the path A from the reflector to a receiver enters the first propagation ring in a distorted condition caused by the elliptical reflector. The depth of the first propagation ring compensates for the phase distortion. Each successive propagation ring further compensates the signal phase, such that when it enters the conical section 34 of the feed horn, it is substantially a circularly polarized signal having components of the same magnitude and orthogonality to each other, as is required of a circularly polarized signal.

The depth of the corrugations are selected between 0.25λ and 0.5λ and optimized to ensure proper local phase and amplitude. The depths are determined based on analysis of the modes of the circularly polarized signal. Specifically, the depth for each corrugation is determined such that the corrugation contributes to the overall correction of the circularly polarized signal, such that a distorted circularly polarized signal entering the feed horn from the reflector is corrected by each corrugation such that it enters the conical section as a circularly polarized signal and visa versa for signals traveling from the conical section to the reflector. The depth of each corrugation is selected by first determining the compensation contribution for every point on the corrugation as a function of the corrugations distance R from the field. The depth of the corrugation is determined to provide the compensation desired for the corrugation. This is described more fully in co-pending application Ser. No. 10/370,166, and hence will not be repeated herein.

The back end of the circular waveguide section 32 of the feed horn 30 includes an annular flange 39 that projects radially outwardly from the circular cylindrical section 32. The flange 39 facilitates coupling of the feed horn 30 to the polarizer 60. In particular, as noted, that coupling permits the polarizer to be rotated with respect to the feed horn, which is prevented from rotating by virtue of its connection to fixed structure of the feed assembly. The feed horn 30 includes mounting lugs L for affixing the feed horn to the fixed structure. The rear side of the flange 39 facing the polarizer 60 defines a circumferentially extending slot 41 for purposes explained below.

The polarizer 60 in the illustrated embodiment comprises a circular cylindrical tube inside of which a dielectric card or vane 61 is mounted along a diameter of the tube. When the vane 61 is oriented vertically or horizontally, the polarizer is configured for propagation of LP signals. Rotation of the polarizer 60 to position the vane at 45 degrees to the vertical configures the polarizer for propagation of RHCP or LHCP signals. The front end of the polarizer nearest the feed horn flange 39 includes a radially outwardly projecting ring or flange 62; the opposite end of the polarizer similarly includes a ring or flange 63. A forwardly projecting protrusion or stop 64 is formed on the forward side of the front flange 62 facing the feed horn flange 39. When the polarizer is coupled with the feed horn, the stop 64 fits into the slot 41 formed in the feed horn flange 39. Accordingly, the polarizer 60 can be rotated about its axis over the defined range of the slot 41 only. The slot 41 is configured so that when the polarizer is rotated as far as it will go in one direction, the vane 61 is oriented vertically, and when the polarizer is rotated as far as it will go in the other direction, the vane is oriented at 45 degrees to the vertical. It will be recognized that a similar result could be obtained by having a slot in the polarizer flange 62 and a stop on the feed horn flange 39, or by other types of rotation-limiting arrangements.

The polarizer 60 is coupled to the feed horn 30 by a coupling comprising two semi-circular clamp halves 65*a* and 65*b* that are fastened together by suitable fasteners so as to form a circular clamp. The clamp halves each defines a circumferential channel or groove 66 on its radially inward side configured to receive the feed horn flange 39 and the polarizer flange 62 in coaxial adjacent relation with each other. The clamp halves are fixed in relation to the feed horn 30 by virtue of projections 67 on the feed horn that engage recesses 68 in the clamp halves, thus preventing the clamp halves from rotating relative to the feed horn. There is sufficient axial and radial clearance between the polarizer flange 62 and the adjacent surfaces of the clamp halves 65*a,b* and feed horn flange 39 to allow the polarizer to be rotated about its axis relative to the feed horn, but the clearance is small enough to maintain the polarizer properly coupled in coaxial relation with the feed horn.

The feed assembly also includes a waveguide transition 70 used for coupling the polarizer 60 to the LNB 80. The waveguide transition 70 comprises a circular cylindrical tubular member having a radially outwardly projecting flange 72 on a front end thereof facing the polarizer. The feed assembly includes clamp halves 69*a* and 69*b*, configured similarly to the previously described clamp halves 65*a,b*, for coupling together the polarizer and waveguide transition by capturing their respective flanges 63 and 72. The flange 72 includes a forwardly extending projection 74 that engages in recesses defined in the clamp halves 69*a,b* to prevent the clamp halves from rotating relative to the waveguide transition; since the waveguide transition is connected to the fixed LNB 80, the clamp halves thus are prevented from rotating along with the polarizer 60 when the polarizer is rotated to switch between LP and CP configurations. The waveguide transition includes a mounting flange 76 at its rear end, the flange having through-holes for receiving fasteners, to facilitate attachment of the waveguide transition to the LNB 80.

As noted, the polarizer 60 can be rotated relative to the feed horn 30 to switch between LP and CP modes of operation. Advantageously, the polarizer has a mark or projection 78 and the clamps 65, 69 have marks or projections 79, the marks being located such that when the mark 78 on the polarizer is circumferentially aligned with the mark 79 on the clamps, the polarizer is in one of the LP or CP configurations. Thus, the clamp 65 is circumferentially aligned properly relative to the feed horn 30 by the engagement of the feed horn projection 67 in the recesses 68 in the clamp 65, and the polarizer in turn is properly aligned relative to the clamp 65 via the alignment of the marks 78, 79. The marks 78, 79 act as visual references for the installer.

The illustrated embodiment discloses that the polarizer 60 is a circular section containing a vain or card. However, it must be understood that there are other configurations of the polarizer. For example, the section could have a rectangular shape. In this embodiment, irises would be used in the section to set the handedness.

Figure 7A:
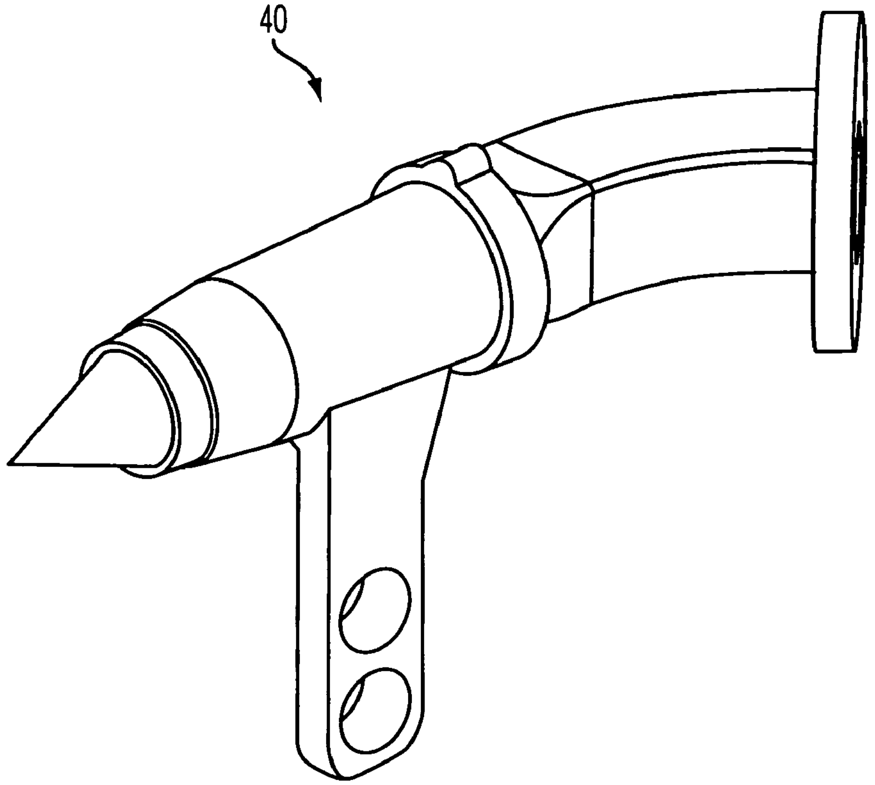
FIGS. 7A and 7B are respective perspective and cross-sectional views of the BSS feed horn.
Figure 7B:
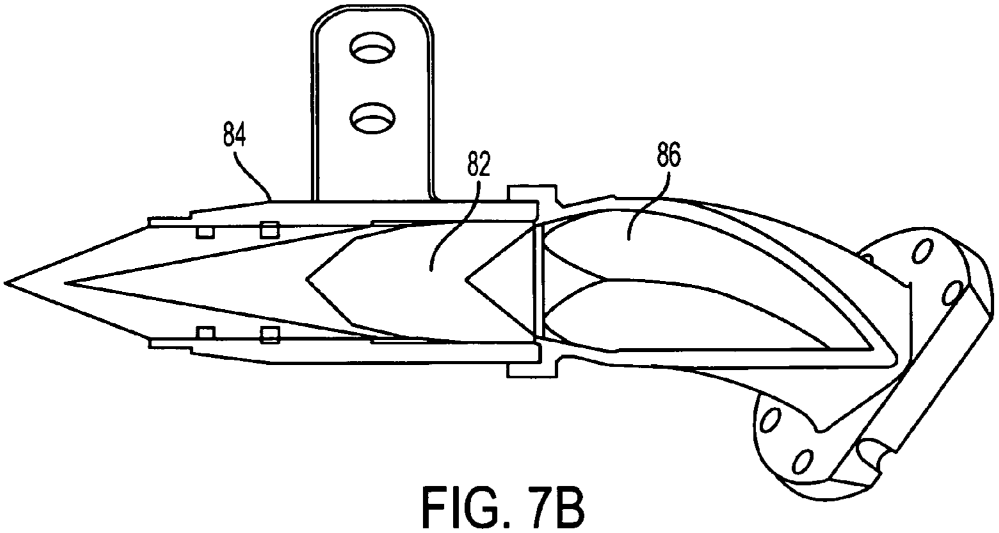

As shown in FIG. 2, the assembly of the feed horn 30 and polarizer 60 is positioned closely adjacent the second feed 40 for establishing separate communications links with satellites spaced as close as two degrees apart along the geostationary arc. FIGS. 7A and 7B are respective perspective and cross-sectional views of the second feed 40. The second feed 40, as shown, comprises a cylindrical rod 82 of polymer material mounted inside a metal tubular housing 84. As illustrated in FIG. 7B, the second feed may include a dielectric vane 86 mounted inside the rear end of the metal housing, oriented 45 degrees to the vertical, to set the proper handedness when the feed 40 is used for propagating CP signals. Importantly, the use of the dielectric radiator 82 facilitates positioning the two feeds 30, 40 in close proximity. Specifically, use of the dielectric material allows the feed to be made smaller, such that the feeds can be closely spaced. Either one or both of the feeds can contain a dielectric (such as the radiator 82 of the second feed) having a dielectric constant greater than 1.0, if needed. Construction of feeds for closely spaced satellites is discussed more fully in U.S. Pat. No. 6,480,165, entitled "Multi-beam Antenna for Establishing Individual Communication Links with Satellites Positioned in Close Angular Proximity to Each Other", which is incorporated herein by reference in its entirety.

Referring again to FIGS. 1 and 2, the solution may include any number of added feeds for communication with other satellites. As illustrated, the solution includes a feed 50 for communicating with a different satellite. The solution allows for communication with a plurality of satellites that are spaced apart. As discussed above, any or all of the feeds 30, 40, and 50 can be filled with a dielectric material to thereby reduce their size, such that they may be spaced close together depending on the spacing of the satellites they are in communication with. Further, it is noted that any or all of the feeds may be configured for either one-way or two-way communications.

Provided below are some, but not all, of the advantages of the present invention:

A feed horn capable of receiving and/or transmitting both RHCP and LHCP signals for use in antennas having elliptical and/or rectangular profile.

A feed horn capable of receiving and/or transmitting both vertically and/or horizontally polarized signals for use in an antenna having elliptical and/or rectangular profile.

An elliptical feed horn capable of reception and/or transmission of both RHCP and LHCP signals having an axial ratio better than 0.5 dB or 30 dB cross-polarization.

An elliptical feed horn capable of reception and/or transmission of both RHCP/LHCP and linear signals from a reflector having an aspect ratio larger than one.

An elliptical feed horn capable of simultaneous reception and transmission of both RHCP and LHCP signals from single offset reflector having various clearance angle and aspect ratio.

An elliptical feed horn capable of reception and/or transmission of both RHCP/LHCP and linearly polarized signals from a reflector having aspect ratio equal to or greater than one.

A field selectable elliptical feed horn and polarizer capable of reception of RHCP, LHCP, and linear polarization signals from reflector having an aspect ratio equal or larger than one.

The FSS field selectable feed and plarizer assembly is also designed to accommodate additional DBS feed to be positioned as close as two degrees from the FSS feed. The DBS feed is also loaded with dielectric material to reduce the mechanical and the physical size of the DBS feed. The combination of the two DBS and FSS feeds communicate with the multiple satellites spaced two degrees apart.

A compact selectable feed horn and polarizer capable of reception of RHCP/LHCP and/or linear signal, in conjunction with polyrod feed and LNB assembly, positioned adjacent to each other for communicating with two satellites positioned as close as two degrees and as much as twenty degrees apart.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A feed assembly for use in establishing a communications link with a first satellite, in an antenna that has a reflector with a non-circular profile, the feed assembly being field-switchable between circularly polarized and linearly polarized operating modes, the feed assembly comprising:

(a) a feed horn comprising:

a circular waveguide section having opposite first and second ends;

a corrugated waveguide section having a wall encircling a longitudinal axis of the feed horn; and a conical waveguide section connected between the corrugated waveguide section and the first end of the circular waveguide section;

wherein an inner surface of the wall of the corrugated waveguide section defines a circular cross-section at a narrow end of the corrugated waveguide section adjacent to the conical waveguide section, the inner surface progressively widening to a non-circular cross-section at an opposite wide end of the corrugated waveguide section, the inner surface of the wall defining a plurality of concentric circumferential grooves spaced along the longitudinal axis of the feed horn, the grooves each having a depth defined in a thickness of the wall of the corrugated waveguide section, the depths of the grooves varying such that the grooves progressively transition from substantially circular at the narrow end of the corrugated waveguide section to substantially non-circular at the wide end of the corrugated waveguide section, such that the grooves compensate for distortions caused to circularly polarized signals propagating through the feed horn by the non-circular shape of the reflector; and (b) a polarizer rotatably coupled to the second end of the circular waveguide section such that the polarizer is rotatable with respect to the feed horn between first and second orientations displaced 45° apart, the polarizer being structured and arranged in the first orientation to be substantially transparent to a linearly polarized signal propagated through the assembly, and in the second orientation to impart right or left handedness to a circularly polarized signal propagated through the assembly.

2. The feed assembly of claim 1, wherein the polarizer comprises a circular cylindrical tube having a planar vane of dielectric material mounted inside the tube so as to partition the interior of the tube into halves, wherein the vane is oriented vertically in the first orientation and is inclined 45 degrees to vertical in the second orientation.

3. The feed assembly of claim 1, wherein the feed horn contains a dielectric radiator having a dielectric constant greater than 1.0 for reducing a cross-section of the feed horn.

4. The feed assembly of claim 1, wherein the grooves at the wide end of the corrugated waveguide section are elliptical for use with an elliptical reflector.

5. The feed assembly of claim 1, further comprising a second feed positioned alongside the feed horn for establishing a communication link with a second satellite.

6. The feed assembly of claim 5, wherein the feed horn and the second feed are positioned so as to communicate with the first and second satellites spaced as close as 2 degrees apart.

7. The feed assembly of claim 6, wherein at least one of the feed horn and the second feed contain a dielectric radiator having a dielectric constant greater than 1.0.

8. The feed assembly of claim 1, further comprising a coupling arrangement that rotatably couples the polarizer and the circular waveguide section.

9. The feed assembly of claim 8, wherein the circular waveguide section of the feed horn has a radially outwardly projecting flange formed proximate the second end of the circular waveguide section, and the polarizer comprises a substantially circular cylindrical main body having a first end adjacent the flange and an opposite second end, the main body having a radially outwardly projecting first ring formed proximate the first end of the main body, and wherein the coupling arrangement includes a first coupler structured and arranged to engage the first ring on the polarizer and the flange on the circular waveguide section so as to substantially prevent relative axial movement therebetween while permitting the polarizer to rotate relative to the circular waveguide section.

10. The feed assembly of claim 9, wherein the first coupler comprises a bandshaped member that surrounds the flange and first ring and defines a circumferential groove in which the flange and first ring are retained.

11. The feed assembly of claim 10, wherein the first coupler is formed in two generally semicircular halves that are releasably joined together by fasteners.

12. The feed assembly of claim 9, wherein the polarizer includes a stop that interacts with a fixed structure of the feed assembly so as to limit rotation of the polarizer.

13. An antenna for establishing individual communication links with at least first and second satellites located at different geostationary positions spaced as close as 2 degrees apart, the antenna comprising:

a reflector having a non-circular profile;

a boom affixed to the reflector and extending therefrom;

a feed horn for establishing a communication link with the first satellite, the feed horn comprising:

a circular waveguide section having opposite first and second ends;

a corrugated waveguide section having a wall encircling a longitudinal axis of the feed horn; and a conical waveguide section connected between the corrugated waveguide section and the first end of the circular waveguide section;

wherein an inner surface of the wall of the corrugated waveguide section defines a circular cross-section at a narrow end of the corrugated waveguide section adjacent to the conical waveguide section, the inner surface progressively widening to a non-circular cross-section at an opposite wide end of the corrugated waveguide section, the inner surface of the wall defining a plurality of concentric circumferential grooves spaced along the longitudinal axis of the feed horn, the grooves each having a depth defined in a thickness of the wall of the corrugated waveguide section, the depths of the grooves varying such that the grooves progressively transition from substantially circular at the narrow end of the corrugated waveguide section to substantially non-circular at the wide end of the corrugated waveguide section, such that the grooves compensate for distortions caused to circularly polarized signals reflected from non-circular antenna profile and propagating through the feed horn by the non-circular shape of the reflector; and a second feed positioned alongside the feed horn for establishing a communication link with the second satellite;

wherein at least one of the feed horn and second feed contains a dielectric radiator having a dielectric constant greater than 1.0.

14. The antenna of claim 13, further comprising a polarizer rotatably coupled to the second end of the circular wavegnide section of the feed horn such that the polarizer is rotatable with respect to the feed horn between first and second orientations displaced 45° apart, the polarizer being structured and arranged in the first orientation to be substantially transparent to a linearly polarized signal propagated through the polarizer, and in the second orientation to impart right or left handedness to a circularly polarized signal propagated through the polarizer, whereby the reflector feed is field-switchable between linear polarization and circular polarization modes by rotation of the polarizer between the first and second orientations.

15. The antenna of claim 14, wherein the polarizer comprises a circular cylindrical tube having a planar vane of dielectric material mounted inside the tube so as to partition the interior of the tube into halves, wherein the vane is oriented one of vertically and horizontally in the first orientation and is inclined 45 degrees to vertical or horizontal in the second orientation.

16. The antenna of claim 13, wherein the reflector is generally elliptical, and the grooves at the wide end of the corrugated waveguide section are generally elliptical.

17. A feed horn for propagating circularly polarized signals in an antenna that has a reflector with a non-circular profile, the feed horn comprising:

a circular waveguide section having opposite first and second ends;

a corrugated waveguide section having a wall encircling a longitudinal axis of the feed horn; and a conical waveguide section connected between the corrugated waveguide section and the first end of the circular waveguide section;

wherein an inner surface of the wall of the corrugated waveguide section defines a circular cross-section at a narrow end of the corrugated waveguide section adjacent to the conical waveguide section, the inner surface progressively widening to a non-circular cross-section at an opposite wide end of the corrugated waveguide section, the inner surface of the wall defining a plurality of concentric circumferential grooves spaced along the longitudinal axis of the feed horn, the grooves each having a depth defined in a thickness of the wall of the corrugated waveguide section, the depths of the grooves varying such that the grooves progressively transition from substantially circular at the narrow end of the corrugated waveguide section to substantially non-circular at the wide end of the corrugated waveguide section, such that the grooves compensate for distortions caused to circularly polarized signals propagating through the feed horn by the non-circular shape of the reflector.

18. The feed horn of claim 17, wherein the feed horn is a receive-only feed horn.

19. A multi-beam antenna for establishing individual communication links with at least first and second satellites located at different geostationary positions and in close angular proximity to each other, comprising:

a reflector that directs signals received from the first and second satellites;

a first waveguide positioned with respect to said reflector for establishing a communication link with the first satellite;

a second waveguide positioned alongside said first waveguide and being arranged with respect to said reflector so as to establish a communication link with the second satellite, wherein at least one said first waveguide and said second waveguide has a dielectric constant greater than that of air; and a polarizer rotatably coupled to one of said waveguides such that the polarizer is rotatable with respect to the feed horn between first and second orientations displaced 45° apart, the polarizer being structured and arranged in the first orientation to be substantially transparent to a linearly polarized signal propagated through the assembly, and in the second orientation to impart right or left handedness to a circularly polarized signal propagated through the assembly, whereby said one of said waveguides is capable of operating in either a circularly polarized or linear polarized mode.

20. A multi-beam antenna according to claim 19, wherein both of said waveguides are circular in shape.

21. A multi-beam antenna according to claim 19, wherein one of said waveguides includes an elliptically shaped feed.

22. A multi-beam antenna according to claim 19, wherein the polarizer comprises a circular cylindrical tube having a planar vane of dielectric material mounted inside the tube so as to partition the interior of the tube into halves, wherein the vane is oriented vertically in the first orientation and is inclined 45 degrees to vertical in the second orientation.

23. A multi-beam antenna for establishing individual communication links with at least first and second satellites located at different geostationary positions and in close angular proximity to each other, comprising:

a reflector that directs signals received from the first and second satellites;

a feed comprising a first waveguide positioned with respect to said reflector for establishing a communication link with the first satellite;

a second waveguide positioned alongside said first waveguide and being arranged with respect to said reflector so as to establish a communication link with the second satellite; and a polarizer coupled to said first waveguide such that the polarizer is field adjustable between first and second positions, the polarizer in the first position configuring said feed to operate in a linearly polarized mode, and in the second position configuring said feed to operate in a circularly polarized mode;

wherein at least one of said waveguides has a dielectric constant greater than that of air.

24. A multi-beam antenna according to claim 23, wherein one of said waveguides includes an elliptically shaped feed portion.

* * * * *